US00RE40342E

(19) United States
(12) Reissued Patent
Krieger

(10) Patent Number: US RE40,342 E
(45) Date of Reissued Patent: May 27, 2008

(54) PORTABLE LIGHT WITH STAND

(75) Inventor: Michael Krieger, Miami Beach, FL (US)

(73) Assignee: Vector Products, Inc., Ft. Lauderdale, FL (US)

(21) Appl. No.: 09/918,572

(22) Filed: Aug. 1, 2001

Related U.S. Patent Documents

Reissue of:
(64) Patent No.: 6,056,414
Issued: May 2, 2000
Appl. No.: 09/275,427
Filed: Mar. 24, 1999

(51) Int. Cl.
*F21L 4/02* (2006.01)

(52) U.S. Cl. ..... 362/184; 362/190; 362/399
(58) Field of Classification Search ..... D26/45, D26/50; 362/184, 190, 191, 197, 208, 399
See application file for complete search history.

(56) References Cited

U.S. PATENT DOCUMENTS

| | | | | |
|---|---|---|---|---|
| 2,228,009 | A | 1/1941 | Harford | |
| 2,427,051 | A | 9/1947 | Goudreau | |
| 3,323,118 | A | 5/1967 | Chan | |
| 3,601,595 | A | 8/1971 | Kivela | |
| 3,749,905 | A | 7/1973 | Friedman et al. | |
| 4,048,631 | A | 9/1977 | Flores | |
| 4,208,703 | A | 6/1980 | Orr | 362/287 |
| 4,388,673 | A | 6/1983 | Maglica | 362/183 |
| 4,463,283 | A | 7/1984 | Penney et al. | 362/183 |
| 4,535,397 | A | 8/1985 | May | 362/369 |
| 4,739,457 | A | 4/1988 | Orr | 362/287 |
| 4,782,432 | A | 11/1988 | Coffman | 362/184 |
| 5,077,644 | A | 12/1991 | Schaller et al. | 362/184 |
| D343,917 | S | 2/1994 | Yuen | D26/50 |
| 5,498,934 | A | 3/1996 | Nilssen | 362/205 |
| 5,558,430 | A | 9/1996 | Booty, Jr. | 362/184 |
| D376,216 | S | 12/1996 | Yuen | D26/38 |
| 5,595,436 | A | 1/1997 | Way, Jr. et al. | 362/190 |
| 5,859,582 | A | 1/1999 | Yuen | 362/184 |
| 5,971,562 | A | 10/1999 | Yang | 362/184 |

*Primary Examiner*—Stephen Husar
(74) *Attorney, Agent, or Firm*—Venable, LLP; Robert Kinberg; Jeffri A. Kaminski

(57) ABSTRACT

A portable light includes first and second d.c. lamps. A first housing portion has longitudinal access and encloses the first lamp while projecting a first light beam in a direction of longitudinal access. The first housing portion has a exterior surface contour and includes a compartment containing an electrical device connectable to a d.c. power supply connectable in circuit with the first lamp. A second housing portion is the shape of a hand grip and extends from first side of the first housing portion in a direction transversed to the longitudinal access to the first housing portion. The second housing portion encloses the second lamp which is connectable in circuit with the electrical device for projecting a second light beam in the direction forming at an angle with the longitudinal access of the first housing portion. A support is pivotally connected to the first housing portion and is pivotable between a closed position in which the support has a shape which generally conforms to the contour of the exterior surface of the first housing portion and an open position in which the support forms a stand extending from an opposite side of the first housing portion from that of the first side of the first housing portion for stabilizing the portable light source on a surface so that one of the fist and second lamps can be directed to a work area.

12 Claims, 3 Drawing Sheets

PORTABLE LIGHT WITH STAND

Matter enclosed in heavy brackets [ ] appears in the original patent but forms no part of this reissue specification; matter printed in italics indicates the additions made by reissue.

BACKGROUND OF THE INVENTION

The invention relates to a portable, handheld light, and more specifically to a multi-function portable light which can be utilized as a handheld flash light and which can be additionally utilized as a lamp for lighting a work area without being hand held by the user.

Portable lights employing high intensity lamps powered, for example by a 12 volt or 6 volt battery are well known and are widely commercially available. Such portable lights are often housed in a cylindrical or boxy type housing and it is common to attached a hand grip to the housing for easily directing the light beam.

One inconvenience in utilizing such portable lights is that when the user directs the light beam in a forward direction to light up more distant stretches of a path, the area of the path immediately in front of the footsteps of the user remains dark, presenting the possibility of stumbling over an unseen object and/or irregularity in the pathway. If the user directs the light beam to the immediate area in front of himself or herself, then the more distant areas of the pathway remain dark. Accordingly, the user of the portable light is forced to continue switching the direction of the light beam so that both the immediate area in front of the user as well as the more distant areas can be illuminated. It would be desirable if the user did not have to continue switching directions of the light beam and still have near and distant areas illuminated.

Additionally, it is often desirable to utilize a portable light to illuminate a work area without having to hold the portable light to stabilize it. Furthermore, it is often not necessary to utilize the full candle power of the high intensity lamp for illuminating a relatively close work area. Therefore, it would be desirable to provide a mechanism for stabilizing the portable light on a surface and to utilize a lower intensity lamp beam in order to conserve battery power.

SUMMARY OF THE INVENTION

It is an object of the invention to provide a portable light source which includes both a high intensity lamp for illuminating distant areas and a lower intensity lamp for lighting a close in area, for example a pathway immediately in front of the holder of the portable light source.

It is a further object of the invention to provide a portable light source which includes a deployable stand for stabilizing the light source on a surface so that the portable light source can be used to illuminate a work area without being held by the user.

The above an other objects are accomplished according to the invention by the provision of a portable light which includes first and second d.c. lamps; a first housing portion having a longitudinal axis and enclosing the first lamp for projecting a first light beam in a direction of the longitudinal axis of the first housing portion, the first housing portion having an exterior surface contour and including a compartment containing electrical means for connecting to a d.c. power supply connectable in circuit with the first lamp; a second housing portion having a shape of a hand grip and extending from a first side of the first housing portion in a direction transverse to the longitudinal axis of the first housing portion, the second housing portion enclosing the second lamp connectable in circuit with the electrical means for projecting a second light bean in a direction forming an angle with the longitudinal axis of the first housing portion; and a support pivotally connected to the first housing portion and being pivotable between a closed position in which the support has a shape which gene rally conforms to the contour of the exterior surface of the first housing portion and an open position in which the support forms a stand extending from an opposite side of the first housing portion from that of the first side of the first housing portion for stabilizing the portable light on a surface so that at least one of the first and second lamps can be directed towards a work area.

According to a further feature of the invention, the first lamp has a higher intensity relative to the second lamp. Desirably, the second portion comprising the hand grip includes a free end and the second lamp is arranged near the free end of the hand grip. Preferably the first and second lamps can be independently controlled to switch on and off so that they can be used simultaneously or independent of one another.

According to preferred embodiment of the invention the support includes a first element which is Y-shaped, with the single leg of the Y being pivotally connected to the first housing portion and the two legs at the other end of the Y adapted to rest on the surface when the element is pivoted away from the first housing portion. Desirably, the first housing portion includes a shoulder which presents a stop for limiting the pivoting angle of the first element of the support. In a more preferred embodiment of the invention the support includes a second element that is pivotally connected to the first housing portion for presenting a third leg adapted to rest on a surface when pivoted away from the first housing portion so as to present a three point stand when both the first and second elements of the support are deployed.

Other features, advantages and benefits of the invention will become apparent from the following detailed description when considered in conjunction with the accompanying drawings.

DETAILED DESCRIPTION OF THE INVENTION

Figure 1:
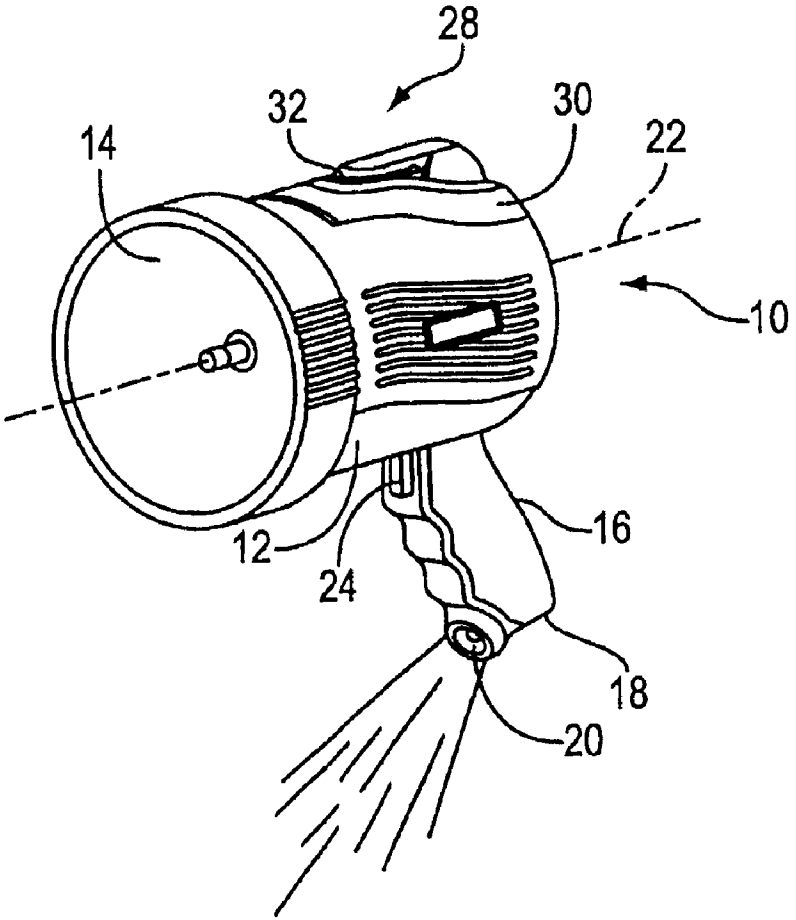
FIG. 1 is a perspective view of a portable light according to the invention.
Figure 6:
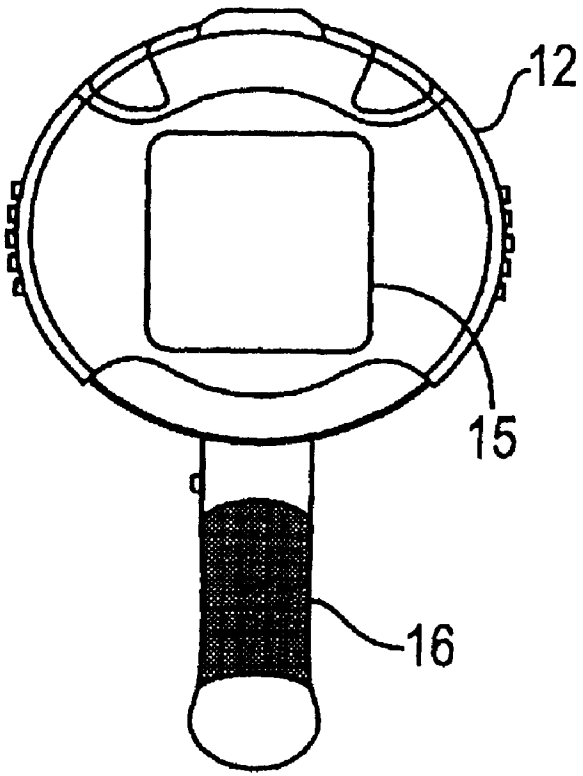
FIG. 6 is a back elevation of the portable light shown in FIG. 1.

Referring to FIG. 1, there is shown a portable light according to the invention which includes a first housing portion 12 enclosing a high intensity lamp 14 and a d.c.

power source (not shown). FIG. 6 shows a back elevation of the light source of FIG. 1 wherein there is shown a cover 15 for a battery compartment in which there is disposed electrical contacts (not shown) for connection to a conventional 12 volt battery (not shown) housed in the compartment. Alternatively, the housing is adapted to store a 12 volt power cord with a cigarette type plug (not shown) that is itself connectable to a 12 volt battery, for example of an automobile through the cigarette lighter. Referring again to FIG. 1, housing 10 additionally includes a second housing portion 16 in the form of a hand grip that extends away from first housing portion 12 and which has a free end 18 in which there is arranged a second, lower intensity lamp 20. High intensity lamp 14 projects a beam generally along the longitudinal access 22 of first housing portion 12. Lower intensity lamp 20 projects a beam along a direction which is at a angle to longitudinal access 22 such that when the user of the portable lamp grasps the hand grip of second housing portion 16 and projects the beam of high intensity lamp 14 in a forward direction, the beam of the lower intensity lamp 20 will illuminate a pathway immediately in front of the foot steps of the user. Accordingly, the high intensity lamp 14 is utilized to illuminate more distant objects in front of the user while the lower intensity of lamp 20 is utilized to illuminate the foot path immediately in front of the user so that the user does not have to change the direction of the high intensity lamp in order to illuminate the foot path immediately in front of himself or herself.

High intensity lamp 14 is connected in a series circuit (not shown) with either the battery (not shown) enclosed within first housing portion 12 or the 12 volt power cord which itself is connectable to a battery. Lamp 14 is controllable on and off by a push button switch 24 which can be held in a depressed (on) position by a pin 26 (FIG. 5) which removably engages push button switch 24 for holding it in the depressed position in a manner which is well known in the art.

Figure 2:
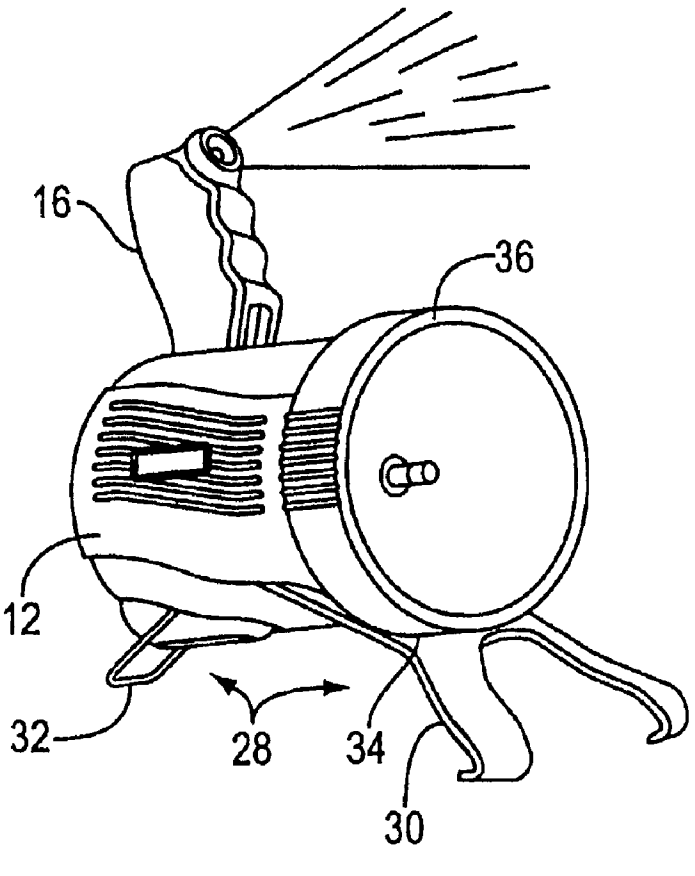
FIG. 2 shows another perspective view of the portable light according to the invention and showing a three legged support deployed for forming a stand for the portable light.
Figure 4:
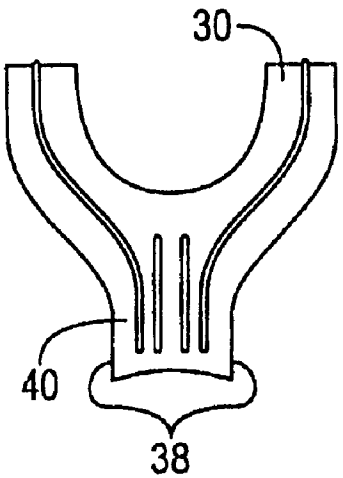
FIG. 4 is an elevational view of the "Y" shaped element for use in the deployable support illustrated in FIGS. 2 and 3.
Figure 3:
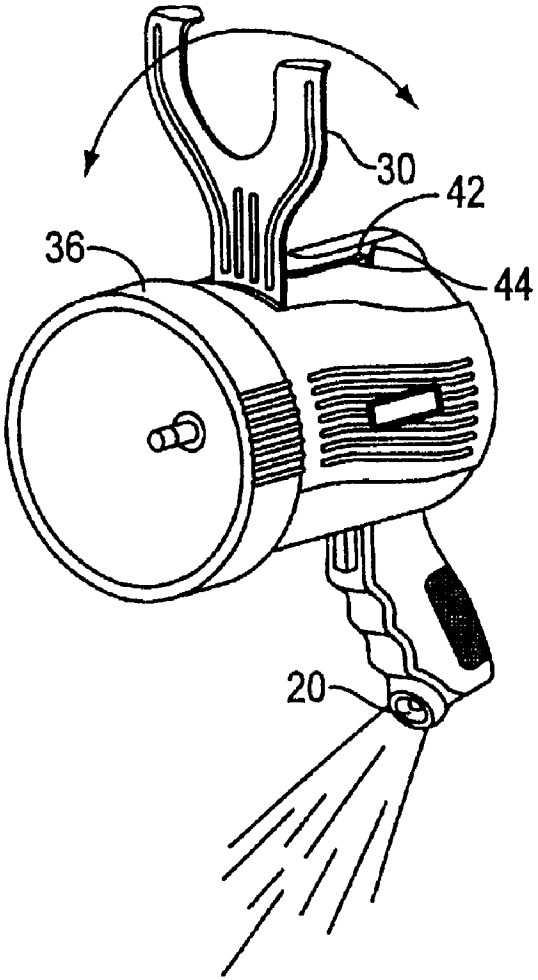
FIG. 3 is a further perspective view of the portable light according to the invention showing one of the elements of the support partially deployed.
Figure 5:
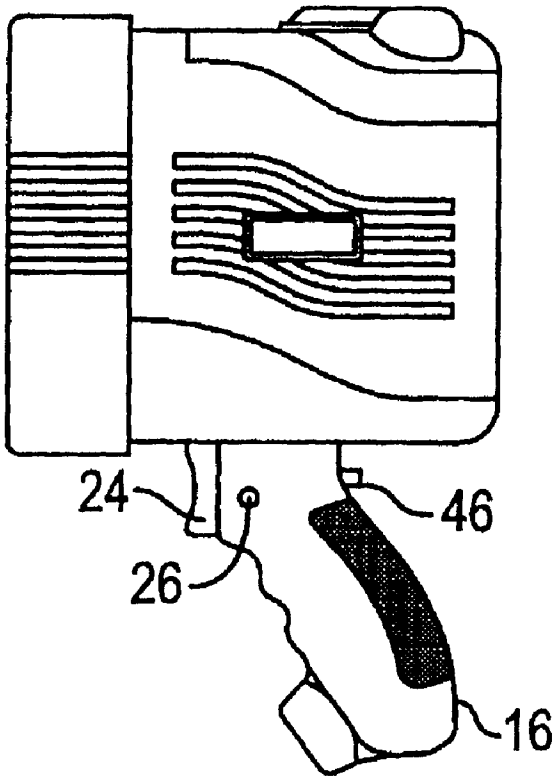
FIG. 5 is a right side elevational view of the portable light illustrated in FIG. 1.

The portable light according to the invention additionally includes a support 28 which is located on a side of first housing portion 12 opposite from that of hand grip 16. As shown in FIG. 2, support 28 includes a first Y-shaped element 30 and a second element 32, both of which are pivotally connected to first housing connection 12. FIGS. 1, 5 and 6 shows support 28 in a closed position whereby element 30 and element 32 both lay flat against housing portion 12 and thus generally conform with the contour of the exterior surface of first housing portion 12. FIG. 2 shows support 28 in a deployed position whereby Y-shaped element 30 and element 32 are pivoted away from the housing to present essentially a three point stand for the portable light. Element 32 also functions as a hanging hook for the handheld light. FIG. 3 shows Y-shaped element 30 in a partially deployed position. In a fully deployed position, Y-shaped element 30 rests against a shoulder 34 as shown in FIG. 2 presented, for example, by a bezel 36 surrounding lamp 14. FIG. 4 illustrates Y-shaped element 30 and shows pins 38 projecting laterally from the single leg end 40 of Y shaped element 30. Pins 38 engage corresponding recesses (not shown) in first housing portion 12 to allow Y shape element 30 to be pivoted between closed and open positions.

Element 32 is in the form of a partial loop and has projections 42 (see FIG. 3) which engage corresponding recesses in first housing portion 12 to allow element 32 to pivot between open and closed positions. Additionally, first housing portion 12 presents shoulders 44 against which element 32 rests in its fully deployed position to thereby limit the pivoting angle of element 32. Element 32 also functions as a hanging hook for the handheld light.

A push button switch 46 located on the rear side of hand grip 16 is connected in a series circuit (not shown) with low intensity lamp 20 and the battery (not shown) or 12 volt power cord (not shown) enclosed within first housing portion 12. Accordingly, high intensity lamp 14 which is controlled by switch 24 and low intensity lamp 20 controlled by push button switch 46, can be independently controlled to be on and off.

In use, the portable light according to the invention can be utilized as a traditional flash light. The high intensity lamp can be used, for example, for illuminating distant portions of a pathway as well and the low intensity beam can be used simultaneously for illuminating the path immediately in front of the user. Additionally, the portable light according to the invention can be utilize to illuminate a work space by deploying the support 28 so that the portable light rest on a three point Stand whereby either one or both of the lamps may be turned on to illuminate the workspace. Typically, with a close-in workspace, only the low intensity lamp need be turned on to conserve battery power.

The invention has been described in detail with respect to preferred embodiments, and it will now be apparent from the foregoing to those skilled in the art, that changes and modifications may be made without departing from the invention in it's broader aspects, and the invention, therefore, as defined in the appended claims, is intended to cover all such changes and modifications as fall within the true spirit of the invention.

What is claimed is:

1. A portable light, comprising:

first and second battery operated lamps;

a first housing portion having a longitudinal axis and enclosing the first lamp for projecting a first light beam in a direction of the longitudinal axis of the first housing portion, the first housing portion having an exterior surface and including a battery compartment for holding a battery connectable in circuit with the first lamp;

a second housing portion having a shape of a hand grip and extending from a first side of the first housing portion in a direction transverse to the longitudinal axis of the first housing portion, the second housing portion enclosing the second lamp connectable in circuit with the battery for projecting a second light beam in a direction forming an angle with the longitudinal axis of the first housing portion; and a support pivotally connected to the first housing portion and being pivotable between a closed position in which the support lies flat against the exterior surface of the first housing portion and an open position in which the support forms a stand extending from [an opposite side of] the first housing portion [from that of the first side of the first housing portion] for stabilizing the portable light source on a surface so that at least one of the first and second lamps can be directed toward a work area.

2. The portable light source according to claim 1, wherein the first lamp has a higher intensity relative to the second lamp.

3. The portable light source according to claim 1, wherein the second housing portion has a free end and the second lamp is arranged in second housing portion near the free end.

4. The portable light source according to claim 3, and further including switches for independently switching the first and second lamps on and off.

5. The portable light source according to claim 1, wherein the support includes a first element having a shape of a Y, with the single leg at one end of the Y pivotally connected to the first housing portion and the two legs at the other end of the Y adapted to rest on a surface when the first element is pivoted away from the first housing portion.

6. The portable light source according to claim 5, wherein the first housing portion includes a first shoulder which presents a stop for limiting a pivoting angle of the first element of the support.

7. The portable light source according to claim 5, wherein the support includes a second element pivotally connected to the first housing portion for presenting a third leg adapted to rest on a surface when pivoted away from the first housing portion.

8. The portable light source according to claim 7, wherein the first housing portion includes a second shoulder which presents a second stop for limiting a pivoting angle of the second element of the support.

9. The portable light source according to claim 1, wherein the compartment is adapted to receive a battery.

10. The portable light source according to claim 1, wherein the compartment is adapted to receive a d.c. power cord.

11. The portable light source according to claim 1, wherein the support generally conforms to a contour of the exterior surface of the first housing portion in the closed position.

*12. The portable stand of claim 1, wherein the stand extends from an opposite side of the first housing portion from that of the first side of the first housing portion.*

* * * * *